United States Patent
Howarth et al.

[11] Patent Number: 6,132,149
[45] Date of Patent: Oct. 17, 2000

[54] TWIST DRILLS

[75] Inventors: Bertram Victor Howarth, Sheffield; Richard Goodwin, Rotherham, both of United Kingdom

[73] Assignee: Dormer Tools (Sheffield) Limited, Sheffield, United Kingdom

[21] Appl. No.: 08/826,795

[22] Filed: Mar. 25, 1997

[30] Foreign Application Priority Data

Mar. 26, 1996 [GB] United Kingdom .................. 9606370

[51] Int. Cl.$^7$ .................................................. B23B 51/02
[52] U.S. Cl. .......................................... 408/230; 408/229
[58] Field of Search .................................. 408/199, 227, 408/230; 175/229, 399, 394

[56] References Cited

U.S. PATENT DOCUMENTS

| | | | |
|---|---|---|---|
| 2,795,979 | 6/1957 | Zerwick | 408/229 |
| 3,237,488 | 3/1966 | Parone et al. | |
| 3,564,947 | 2/1971 | Maier | 408/227 |
| 3,977,807 | 8/1976 | Siddall | 408/230 |
| 4,688,972 | 8/1987 | Kubota | 408/227 |
| 4,740,121 | 4/1988 | Arnold | 408/230 |
| 4,913,603 | 4/1990 | Friedli et al. | |
| 5,056,967 | 10/1991 | Hageman | 408/230 |
| 5,141,369 | 8/1992 | Palace | 408/230 |
| 5,186,584 | 2/1993 | Muller et al. | 408/230 |
| 5,380,133 | 1/1995 | Schimmer | 408/199 |
| 5,486,075 | 1/1996 | Nakamura et al. | 408/230 |
| 5,590,987 | 1/1997 | Bouzounie | 408/227 |
| 5,716,172 | 2/1998 | Nakamura et al. | 408/227 |

FOREIGN PATENT DOCUMENTS

| | | |
|---|---|---|
| 33 25 149 | 1/1985 | Germany . |
| 1 432 546 | 4/1976 | United Kingdom . |
| 2 184 046 | 6/1987 | United Kingdom . |

OTHER PUBLICATIONS

Patent Abstracts/Japan vol. 96, No. 010: JP 08 155 713 (Toshiba Tungaloy Co. Ltd.).

*Primary Examiner*—Steven C. Bishop
*Attorney, Agent, or Firm*—Burns, Doane, Swecker & Mathis, L.L.P.

[57] ABSTRACT

A helical twist drill has fluted lands each having projecting from their radially outer faces a plurality of circumferentially spaced support margins. At least one of the support margins is asymmetrically spaced with respect to the other support margins.

9 Claims, 2 Drawing Sheets

TWIST DRILLS

BACKGROUND OF THE INVENTION

This invention relates to twist drills, and more particularly but not necessarily exclusively to twist drills for producing holes of high accuracy in materials that are difficult to work, especially hard materials.

A conventional twist drill comprises a cylindrical drill body provided with a pair of helical flutes defining fluted lands between them and extending from the cutting point of the drill to a shank at the other end, by which shank the drill is securable in a chuck, for example, of a hand tool, or a drilling machine. The cutting point of the drill is of generally conical-shape, with a central chisel edge from which a pair of diametrically opposed cutting edges defined by the leading faces of the fluted lands and the flanks of the drill point that form the end faces of the fluted lands. The outer periphery of each fluted land has at its leading edge a radial projection which is variously termed a land, a cylindrical land, a wear margin, or a support margin. These two support margins extend along the length of their fluted lands and are intended to guide the drill radially as it forms a hole.

In conventional twist drills, there is a tendency to chatter, which can lead to the wall of the hole being drilled having grooves or tracks. The circularity and straightness of a hole produced by a conventional twist drill are also often inadequate for many applications. These defects are particularly pronounced when drilling very hard materials, and necessitate a subsequent reaming operation where dimensional accuracy of the hole is required.

It has been recognized that the use of only two support margins is inadequate for guiding the drill in its hole in certain applications. For example, in U.S. Pat. No. 4,913,603 there is provided a twist drill having three support margins, one at the leading edge of each of the two fluted lands and one of the fluted lands being wider than the other at its radially outer face and having a further support margin at its trailing edge to give three-point guidance. This prior art drill is also required to have cutting edges at unequal spacings. The fluted lands are therefore asymmetrical in transverse cross-section which is generally undesirable, and in any event the arrangement still does not provide adequate stability for many applications.

In British Patent 1,432,546 there is described a twist drill having symmetrical pairs of flutes and fluted lands, each of the two fluted lands having support margins at both its leading and trailing edges. Each leading edge support margin is relieved in the region nearest the drill point, so that the trailing edge support margin is required to have a cutting action widening the hole to the full diameter of the drill. This construction, however, does not overcome the instability problem encountered in drilling very hard materials.

A particular application where difficulties of accuracy of drilling have arisen is in the preparation of rock drill bits for mining applications. Rock drill bits have bodies made from very hard steels, of a generally bulbous construction, with a number of wear resistant hard metal teeth embedded in the front face of the body. The teeth or studs are inserted with an interference fit into holes drilled in that front face. At present the holes need to be drilled and then reamed to provide sufficient accuracy and a sufficiently good surface finish for the teeth or studs to be a firm fit within them. However, even the use of a reamer cannot rectify the problem caused by a hole that has not been drilled sufficiently straight.

There is therefore a need for a drill which can provide holes of improved circularity, surface finish and straightness, to close tolerances, particularly when drilling materials which are difficult to work, and especially hard materials.

SUMMARY OF THE INVENTION

According to the invention, there is provided a twist drill comprising a drill body having a plurality of helical flutes between fluted lands extending along the body to a leading end of the drill, each said fluted land having a plurality of circumferentially spaced support margins projecting from its radially outer face, at least one of the support margins being asymmetrically spaced with respect to the other support margins.

The twist drill is conveniently formed with two helical flutes between two diametrically opposite and symmetrically disposed fluted lands, each having a pair of spaced support margins.

Preferably, the profile of each helical flute is such that the drill is provided at its cutting end with two convex curved cutting edges, in the manner disclosed in British Patent 2,184,046.

For drilling hard materials, as already referred to, the material of the drill tip preferably comprises hard metals such as tungsten carbide. In particular instances it may be preferred for the drill to have a steel shank with a tungsten carbide tip.

Twist drills according to the invention are preferably provided with a wear-resistant coating, which can, for example, be a nitride or carbide coating or combinations thereof. The coating may be multi-layered, for example, the inner layers functioning to promote adhesion of the coating to the drill body and the outer layers providing wear-resistant characteristics.

The central web of a drill according to the invention is preferably thinned to produce secondary cutting edges which have a negative axial rake of 1–4°.

In certain applications, and particularly for drilling holes in the body of a rock drill bit, it is advantageous to round the radially outer end of the cutting edge of each fluted land. The end face of the hole cut by the drill is then given a radiused junction with the peripheral wall of the hole to reduce the stress concentration at that region.

As with conventional drills, twist drills according to the invention can have internal holes or galleries which extend along the length of the fluted land for lubrication of the cutting action.

An embodiment of the invention will now be described, by way of example, with reference to the accompanying drawings.

DESCRIPTION OF THE PREFERRED EMBODIMENT

Figure 1:
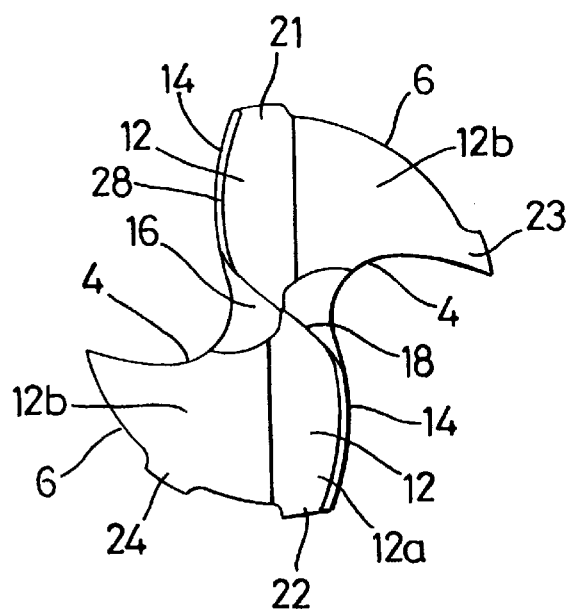
FIG. 1 shows an end elevational view of the cutting end face of a twist drill according to the invention.

Referring to the drawings, the twist drill 1 has a body 2 provided with two diametrically opposite flutes 4 with a 30° helix angle bounding diametrically opposite fluted lands 6.

The cutting point 8 on the leading end of the drill has a point angle of 140°. The leading faces 10 and end faces 12 of the fluted lands form primary cutting edges 14 which are convexly curved in the manner disclosed in British Patent 2,184,046 to which reference can be made for further details. At the outer edge of the fluted lands 6 the main cutting edges 14 have a negative radial rake.

Each end face 12 has, immediately adjacent the cutting edge 14, a relatively narrow portion 12a at a moderate positive rake of 6–8° and a wider portion 12b more steeply raked at about 17–25°. In the central web of the drill between the two fluted lands the cutting point has diametrically opposite reliefs 16 steeply raked to form secondary cutting edges 18 with the portions 12a of the end faces 12. These secondary cutting edges have a negative axial rake 8 of 1–4°. The reliefs 16 thin the central web to leave only a very small chisel edge 20 at the center of the cutting point.

Figure 2:
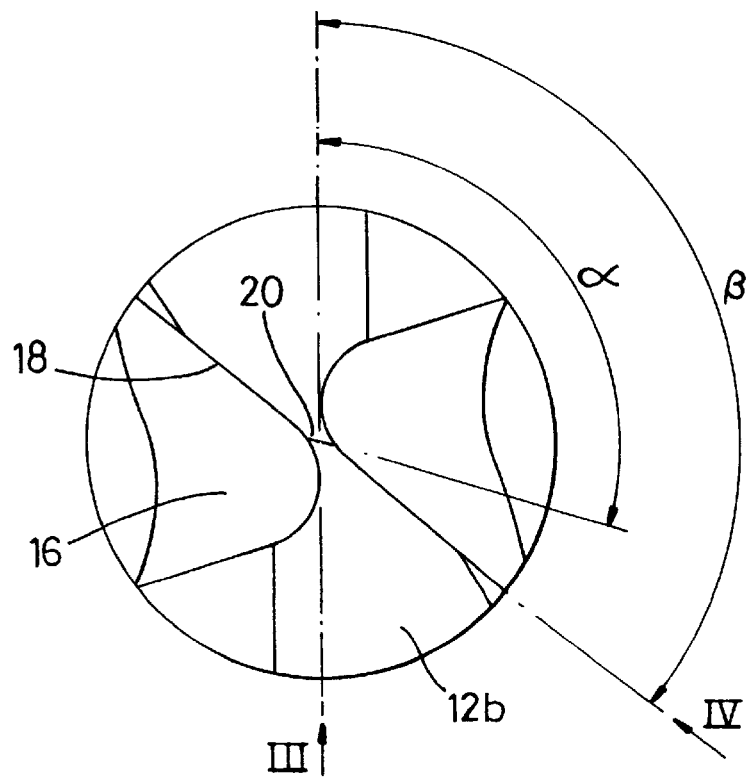
FIG. 2 is a similar view, to a larger scale, of the central region of the drill end face.
Figure 3:
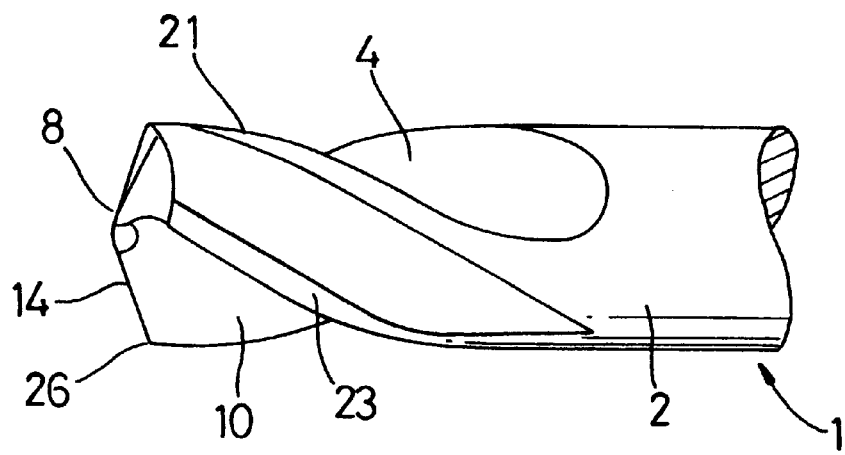
FIG. 3 shows a side elevational view of the leading end of the twist drill of FIG. 1 in the direction III in FIG. 2.
Figure 4:
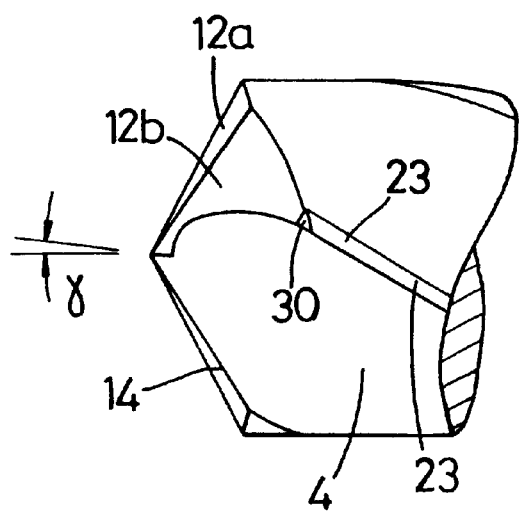
FIG. 4 is a similar side elevational view of the drill tip, to a slightly larger scale, in the direction IV in FIG. 2.

As FIG. 2 shows, relative to a diametrical datum line parallel to the mean orientation of the primary cutting edge 14, the chisel edge 20 lies at an angle $\alpha$, which is preferably in the range 102–110°, and secondary cutting edge 18 lies at an angle $\beta$, which is preferably in the range 135–140°.

At their radially outer ends 26 the main cutting edges 14 are rounded to round the junction between the bottom and peripheral walls of the hole being drilled.

The outer peripheral faces of the fluted lands 6 have pairs of support margins 21, 22, 23, 24 projecting radially to the nominal diameter of the drill. A first support margin 21,22 is located immediately adjacent the leading edge of each fluted land and the main cutting edges 14 continue across the front of these support margins. On one fluted land, the second support margin 23 lies immediately adjacent its trailing edge. On the other fluted land, the second support margin 24 is spaced from both leading and trailing edges. The non-symmetrical arrangement of the support margins has been found to contribute substantially to the stability of the drill in operation.

Each cutting edge is chamfered to form a narrow leading face 28 at a small negative rake. Also, the heel corners of the two fluted lands are chamfered, as indicated at 30.

The drill may have a wear-resistant coating, such as of titanium nitride.

Preferred dimensions of twist drills formed in the manner described are as follows:

Helix angle 25° to 40°, for example about 30°,

Point angle 125° to 150°, preferably about 140°;

Combined fluted land width (measured at the periphery at right-angles to the drill helix), 60% to 80% of the nominal diameter of the drill;

Combined support margin width, 10% to 20% of the nominal diameter of the drill.

Examples of twist drills with the features described have been found to give improved stability during drilling, substantially reducing chattering, and improved hole concentricity.

The performance of a conventional solid carbide or carbide tipped helical drill is generally rated good if it can maintain roundness tolerance of the order 20 microns on an 11 mm diameter hole. Using a drill according to the illustrated example, it has been found that the roundness tolerance can be reduced to 5 microns or less on a 11 mm diameter hole. In addition it has been found possible to obtain up to 2 to 3 times the drill life, and double the penetration rates of conventional tooling. It has also been found that the holes can be drilled very close to size, with good consistency, very little ovality and parallel sides.

Such holes can be drilled with an accuracy of hole size and straightness, and a surface finish comparable with those produced by conventional drills which are completed by a secondary reaming operation. Increased feed rates over conventional tooling can also be achieved, together with a smaller, controlled chip formation.

Twist drills in accordance with the invention can be used in a wide variety of applications requiring improved hole accuracy and good hole surface finish.

What is claimed is:

1. A twist drill comprising a generally cylindrical drill body, a plurality of circumferentially spaced helical flutes extending along said body and fluted lands alternating with said flutes, the drill body having a leading end to which said flutes and fluted lands extend, the fluted lands forming radially outer faces on the drill body, a plurality of circumferentially spaced support margins projecting from the radially outer face of each said fluted land, at least one of said support margins being asymmetrically spaced with respect to the other support margins-of the drill circumferentially of the drill body.

2. A twist drill according to claim 1 wherein the fluted lands are spaced at equiangular intervals circumferentially of the drill.

3. A twist drill according to claim 1 wherein the flutes have corresponding cross-sectional forms.

4. A twist drill according to claim 1 wherein the radially outer face of each fluted land has mutually remote leading and trailing edges in the circumferential direction of the drill body, a first said support margin being located immediately adjacent said leading edge of each fluted land, said first support margins being equally spaced from each other circumferentially of the drill.

5. A twist drill according to claim 1 wherein the radially outer face of each fluted land has mutually remote leading and trailing edges in the circumferential direction of the drill body, and said at least one asymmetrically spaced support margin is located away from the leading and trailing edges of its fluted land.

6. The twist drill according to claim 5 having two fluted lands, each with two support margins, a first of said two support margins being located immediately adjacent the leading edge of the respective fluted land, the second support margin on a first of said fluted lands being located immediately adjacent the trailing edge of said fluted land, and the second support margin on the second said fluted land being at a spacing from both the leading and trailing edges of the fluted land.

7. A twist drill according to claim 5 wherein said second support margin on said second fluted land is located substantially midway between the leading and trailing edges of the fluted land.

8. A twist drill according to claim 1 wherein the support margins have a combined circumferential extent of between 10% and 20% of the nominal diameter of the generally cylindrical body.

9. The twist drill according to claim 1 wherein the body includes a longitudinal center axis of rotation and a cutting means consisting of a cutting edge structure arranged symmetrically relative to the axis.

* * * * *